(12) United States Patent
Chen et al.

(10) Patent No.: US 8,869,254 B2
(45) Date of Patent: Oct. 21, 2014

(54) USER VERIFICATION USING VOICE BASED PASSWORD

(75) Inventors: Yingwei Chen, Hangzhou (CN); Zheng Yang, Hangzhou (CN)

(73) Assignee: Alibaba Group Holding Limited (KY)

( * ) Notice: Subject to any disclaimer, the term of this patent is extended or adjusted under 35 U.S.C. 154(b) by 493 days.

(21) Appl. No.: 12/806,601

(22) Filed: Aug. 16, 2010

(65) Prior Publication Data

US 2011/0047607 A1 Feb. 24, 2011

(30) Foreign Application Priority Data

Aug. 18, 2009 (CN) .......................... 2009 1 0165944

(51) Int. Cl.
- *H04L 29/06* (2006.01)
- *H04L 9/32* (2006.01)
- *G06F 21/31* (2013.01)
- *G06F 21/43* (2013.01)

(52) U.S. Cl.
CPC .............. *H04L 63/0838* (2013.01); *H04L 9/32* (2013.01); *G06F 21/31* (2013.01); *H04L 63/083* (2013.01); *G06F 21/43* (2013.01); *H04L 63/0861* (2013.01); *H04L 63/08* (2013.01)
USPC ........ 726/7; 726/17; 726/19; 726/26; 726/27; 713/182; 713/186; 705/17; 705/30; 705/44

(58) Field of Classification Search
CPC ... H04L 63/0838; H04L 63/08; H04L 63/083; H04L 9/32; H04L 63/0861; G06F 21/43; G06F 21/31
USPC ............................................................ 726/7
See application file for complete search history.

(56) References Cited

U.S. PATENT DOCUMENTS

| | | | |
|---|---|---|---|
| 4,896,346 A | 1/1990 | Belfield et al. | |
| 5,430,827 A | 7/1995 | Rissanen | |
| 5,774,858 A | 6/1998 | Taubkin et al. | |
| 6,959,279 B1 * | 10/2005 | Jackson et al. | 704/258 |
| 7,533,735 B2 | 5/2009 | Gantman et al. | |
| 7,856,477 B2 * | 12/2010 | Libbey et al. | 709/206 |
| 8,275,097 B2 * | 9/2012 | Tonini | 379/88.02 |
| 2002/0026376 A1 * | 2/2002 | Shioda et al. | 705/26 |

(Continued)

FOREIGN PATENT DOCUMENTS

CN 01131828.7 7/2002

OTHER PUBLICATIONS

Wu, Chung-Hsien, and Jau-Hung Chen. "Speech Activated Telephony Email Reader (SATER) Based on Speaker Verification and Tex-to-Speech Convertion." IEEE Transactions on Consumer Electronics [1997], vol. 43, Issue: 3, pp. 707-716.*

*Primary Examiner* — Thanhnga B Truong
*Assistant Examiner* — Narciso Victoria
(74) *Attorney, Agent, or Firm* — Van Pelt, Yi & James LLP (57) ABSTRACT

Verifying a user includes: receiving a service request; generating a text based first dynamic password upon receiving the service request; converting the first dynamic password into sound information; transmitting the sound information to a user terminal over a communication network; receiving over the Internet a second dynamic password entered by the user based on the sound information, the second dynamic password being a text based password; comparing the first and second dynamic passwords for consistency; and indicating that verification is successful if the first and the second dynamic passwords are consistent.

16 Claims, 5 Drawing Sheets

(56) References Cited

U.S. PATENT DOCUMENTS

| | | |
|---|---|---|
| 2002/0181691 A1 | 12/2002 | Miller et al. |
| 2007/0124591 A1 | 5/2007 | Jung et al. |
| 2007/0143625 A1 | 6/2007 | Jung et al. |
| 2007/0162761 A1 | 7/2007 | Davis et al. |
| 2007/0266257 A1 | 11/2007 | Camaisa et al. |
| 2008/0141353 A1 | 6/2008 | Brown |
| 2009/0138366 A1 | 5/2009 | Bemmel et al. |

* cited by examiner

USER VERIFICATION USING VOICE BASED PASSWORD

CROSS REFERENCE TO OTHER APPLICATIONS

This application claims priority to People's Republic of China Patent Application No. 200910165944.3 entitled METHOD, DEVICE AND SYSTEM FOR VERIFYING THE IDENTITY OF INTERNET USER filed Aug. 18, 2009 which is incorporated herein by reference for all purposes.

FIELD OF THE INVENTION

The present invention relates to the field of Internet and in particular to a technique for verifying the identity of an Internet user.

BACKGROUND OF THE INVENTION

Internet based scams and crimes are on the rise as electronic commerce grows. To prevent personal account information from being misappropriated by malicious individuals, a service provider typically verifies the identity of a user accessing a service over the Internet. For example, a user logs onto a secure Internet banking website to make a transfer often goes through the following process: initially, the user registers his or her own number of a mobile phone during registration with Internet banking. Later, when the user selects the transfer service over the Internet, a banking server generates a verification code and transmits the generated verification code in a short message to the mobile phone of the user over a wireless communication network. The user then picks up the verification code, inserts the verification code in response to a prompt from a webpage, the verification code with which the user filled in is transmitted to the bank server over the Internet, and the bank server compares the generated verification code and the verification code received at this time for consistency and only allows the user to proceed if the two codes match.

A recent study shows that this approach has some drawbacks. For example, short messages are prone to delays or data loss, therefore the user sometimes cannot acquire the verification code in a timely manner or even fails to acquire it, thus degrading the reliability of the verification technique.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
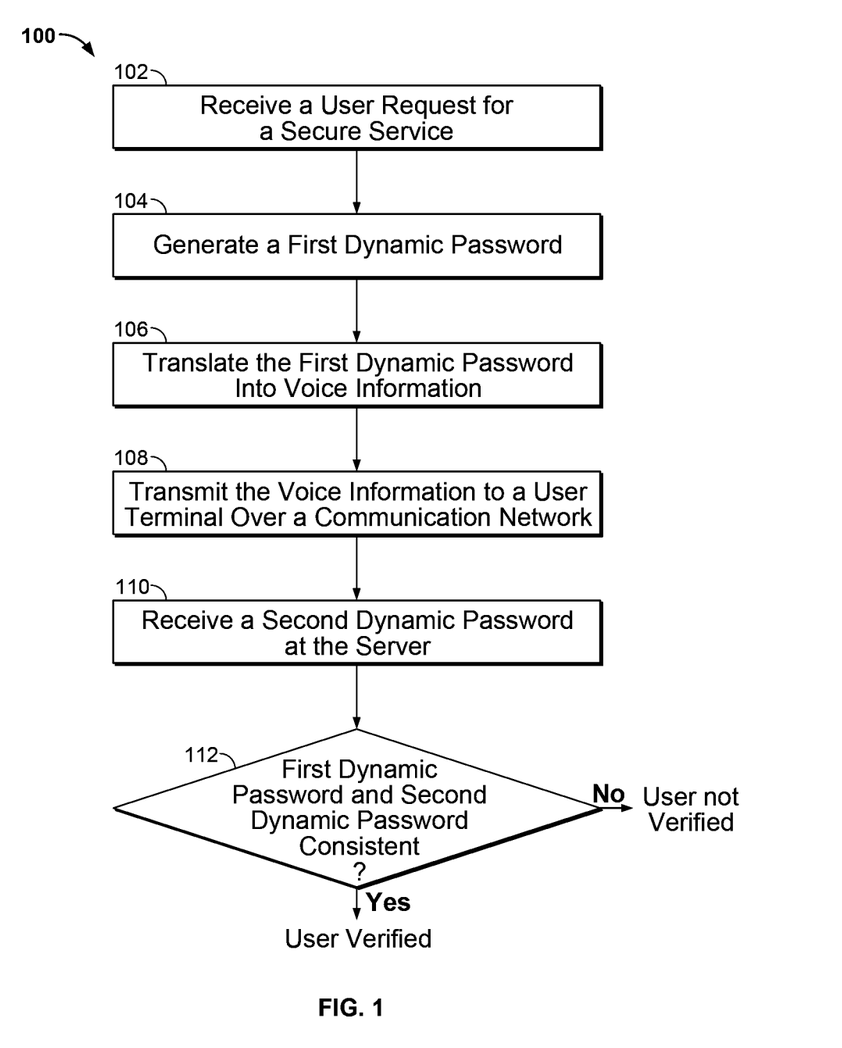
FIG. 1 is a flowchart illustrating an embodiment of a user verification process.

FIG. 1 is a flowchart illustrating an embodiment of a user verification process. Process 100 can be performed on an authentication server or other appropriate device.

At 102, a user request for a secure service is received. In some embodiments, the user request is generated by a server at a secure website when the user accesses the secure website. In some embodiments, when the user accesses the website via a web browser running on a client device such as a computer, a smart phone, or the like, she enters a user identifier (i.e., username) and/or a corresponding user specified password. When the user identifier and/or password are verified, the user request is generated.

At 104, upon receiving the user request, the authentication server generates a first dynamic password to further authenticate the user. The dynamic password may be a random alphanumerical string, a random phrase or sentence, etc., that is valid only for a limited amount of time or only for a single session.

At 106, the first dynamic password is translated into sound information. In various embodiments, a process on the authentication server or a voice translation device coupled to the authentication server performs the translation.

At 108, the sound information is transmitted to a terminal used by the user over a communication network such as a telecommunications network. The user terminal may be a mobile phone, a landline phone, a computer with Voice over IP (VOIP) capability, or any other appropriate device capable of receiving the sound information from the communication network. In some embodiments, the user uses separate devices for logging on and for receiving the sound information. For example, a computer terminal is used for logging on to the service and a telephone is used for receiving the sound information. In some embodiments, the same device is used for user logon and for receiving the sound information. For example the user may logon using a smart phone's web interface and receive the sound information over the phone interface. The communication network through which the voice data is transmitted can be, but is not necessarily, the Internet. For example, a mobile phone network can be used if the user terminal is a mobile phone.

The user listens to the first password and enters what she hears into a client device (e.g., the computer used for login) as text. The text based password is transmitted to the authentication server. The text based password is referred to as the second dynamic password. At 110, the second dynamic password is received at the server.

At 112, the first dynamic password and the second dynamic password are compared for consistency. If the passwords are consistent, the user is verified, an indication of successful verification is made, and further access by the user is allowed. Else, the user is not verified, an indication of unsuccessful verification is made, and further access to the service by the user is denied. Two passwords can be consistent without being identical. For example, the first dynamic password generated by the system is "challenge3". When translated into sound, the user hears the phrase and types "challenge three" into a client device. Although the second dynamic password is not identical to the first, the passwords are deemed consistent because second password accurately reflects the sound information in the first password. Similarly, passwords containing homophones (e.g., "bear" and "bare") can be deemed consistent as long as their corresponding sound information matches.

The above process informs the user about the first dynamic password via audio instead of via a short message, thereby avoids the delay or loss of data packets during the transmission of the short messages. Since communication networks or protocols for transmitting audio signals are often more reliable than the ones used for transmitting short messages, this technique tends to improve the reliability of the identity verification process. Moreover, by informing the user via audio, those users using devices without support for short message function can still be verified before accessing the service.

Figure 2:
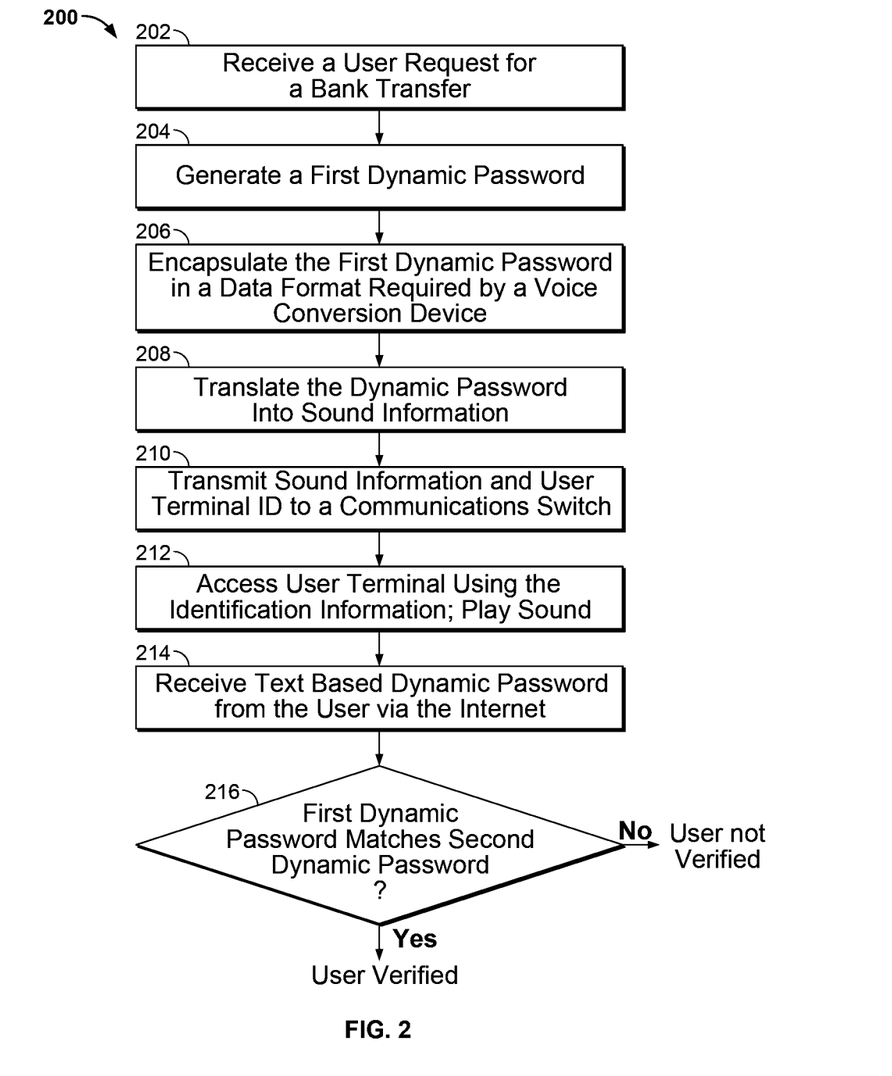
FIG. 2 is a flowchart illustrating an embodiment of a user verification process used in an Internet banking application.

FIG. 2 is a flowchart illustrating an embodiment of a user verification process used in an Internet banking application. Process 200 may be performed on an Internet banking system.

Initially, a user uses a client terminal such as a computer to log on to the Internet banking website and submits a transfer request. At 202, the transfer request is received by a banking server with authentication capabilities. The banking server in response initiates verification of the user's identity.

At 204, a first dynamic password is generated by the bank server. In this example, the dynamic password is a randomly generated cipher comprising an alphanumeric string. Optionally, the bank server can further store the generated dynamic password, set specific parameters for the dynamic password (e.g., the generation time, the expiration time, etc.), and maintain the stored dynamic password, for example, by deleting the dynamic password upon expiration.

At 206, the first dynamic password is encapsulated in a data format required by a voice conversion module coupled to the banking server. In some embodiments, the voice conversion module is an Interactive Voice Response (IVR) device such as a server or a process that supports text-to-speech technology. The encapsulated information includes the dynamic password and also identification information of a user terminal receiving the information. The user terminal can be a mobile phone, a fixed phone, or other devices capable of receiving voice data. The identification information can be a telephone number.

At 208, the dynamic password in the encapsulated information is translated into sound information by the voice conversion module.

At 210, the voice conversion device transmits information including the sound information and the user terminal identification information to a communications switch such as a telephone exchange.

At 212, the communications switch accesses the user terminal using the identification information and attempts to make a connection. In some embodiments, the switch calls the telephone number of the user terminal. If a connection is successfully established, the switch sends the sound information to the user terminal, which plays the sound information for the user.

Upon receiving the sound information of the password, the user inputs the acquired dynamic password as text in response to a prompt from a webpage provided by the bank server. At 214, the text based dynamic password is received by the bank server via the Internet.

At 216, the bank server determines whether the received dynamic password and the previously generated dynamic password are consistent. Specifically, it is determined whether the received text based dynamic password and the previously generated dynamic password have matching alphanumeric strings. If they are consistent, the user's identity is verified and she is allowed to complete the bank transfer; otherwise, the verification and the transfer both fail.

Figure 3:
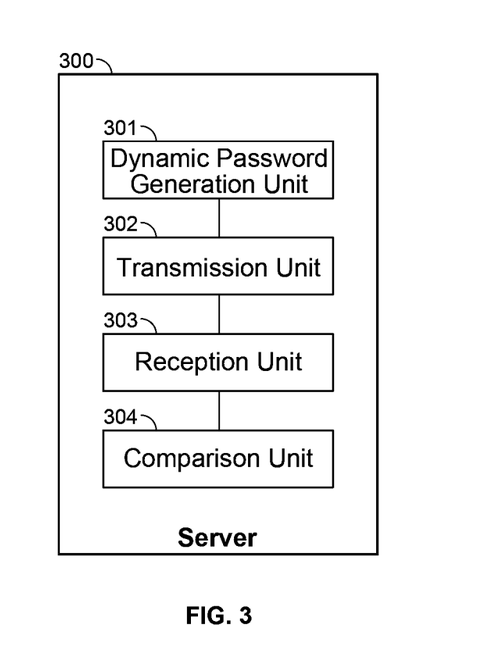
FIG. 3 is a block diagram of an embodiment of a user authentication server.

FIG. 3 is a block diagram of an embodiment of a user authentication server. Server 300 may be implemented using one or more computing devices such as a personal computer, a server computer, a multi-processor system, a microprocessor based system, a network PC, a minicomputer, a large-scale computer, a special purpose device, a distributed computing environment including any of the foregoing systems or devices, or other hardware/software/firmware combination that includes one or more processors, and memory coupled to the processors and configured to provide the processors with instructions.

In this example, system 300 includes a dynamic password generation unit 301 adapted to generate a first dynamic password on reception of a request for an Internet service; a transmission unit 302 adapted to transmit the first dynamic password to a voice conversion device for converting the first dynamic password into sound information and transmitting the sound information to a terminal of a user; a reception unit 303 adapted to receive over the Internet a second dynamic password acquired by the user from the sound information; and a comparison unit 304 adapted to compare the first and the second dynamic passwords for consistency and to pass the verification if they are consistent.

Figure 4:
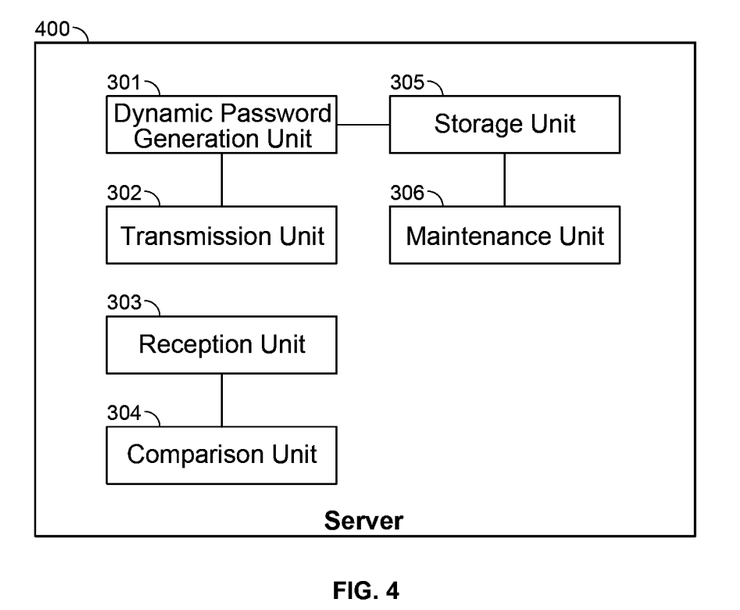
FIG. 4 is a block diagram of another embodiment of a user authentication server.

FIG. 4 is a block diagram of another embodiment of a user authentication server. In this example, system 400 includes a dynamic password generation unit 301 adapted to generate a first dynamic password on receiving a request for an Internet service; a transmission unit 302 adapted to transmit the first dynamic password generated by the dynamic password generation unit 301 to a voice conversion device for converting the first dynamic password into sound information and transmitting the sound information to a terminal of a user; a reception unit 303 adapted to receive over the Internet a second dynamic password acquired by the user from the sound information; a comparison unit 304 adapted to compare the first and second dynamic passwords for consistency, and indicate whether the user is authenticated based on whether the passwords are consistent; a storage unit 305 adapted to store the first dynamic password generated by the dynamic password generation unit 301; and a maintenance unit 306 adapted to maintain the first dynamic password stored in the storage unit 305, such as deleting the stored password when it expires.

In some embodiments, the user authentication system further includes a voice conversion device adapted to convert a received first dynamic password into sound information and to transmit the sound information to a terminal of the user over a communication network; and a server operating on the service provider side, adapted to generate the first dynamic password on reception of a request for an Internet service and transmit the first dynamic password to the voice conversion device, to receive over the Internet a second dynamic password entered by the user based on the sound information, to compare the first and second dynamic passwords for consistency, and to pass the verification if they are consistent.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple sub-units.

Figure 5:
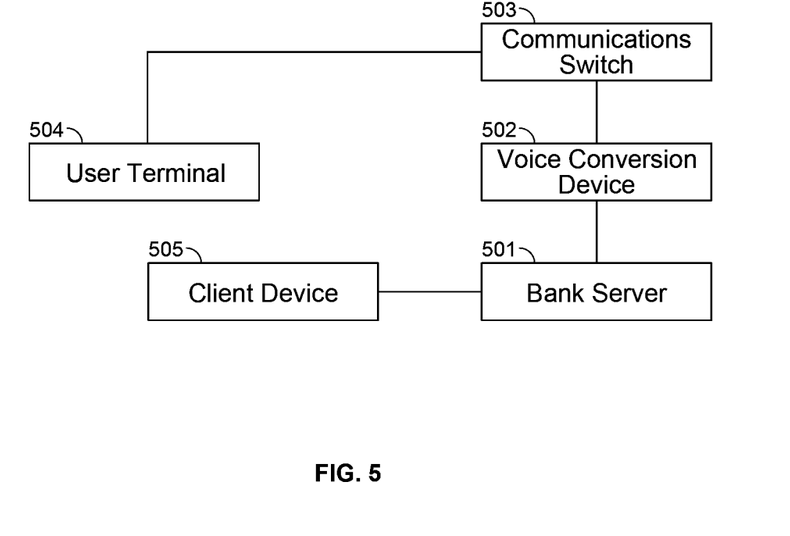
FIG. 5 is a block diagram illustrating an embodiment of a system for verifying the identity of an Internet user.

FIG. 5 is a block diagram illustrating an embodiment of a system for verifying the identity of an Internet user. The example system includes a bank server 501, a voice conversion device 502, a communication switch 503, a user terminal 504, and a client device 505. In some embodiments, the user terminal is a mobile device such as a telephone and the client device is a computer. Referring to process 200 above, client device 505 is used for the user to log on to the banking website and to make a service request. The banking server is used for receiving the user's service request and generating the first dynamic password and sending it to the voice conversion device, which translates the dynamic password into sound and sends the sound information to the communications switch. The communications switch accesses the user terminal and makes a connection to the user terminal. If a connection is successfully established, the sound information is transmitted to the user terminal and played. The user, who has heard the sound information, uses the client device to enter text based password, which is sent to the bank server to be verified. The bank server also grants the user access to the requested service if the password entered by the user matches the password generated by the bank server.

As can be seen from the foregoing descriptions of the embodiments, those skilled in the art can understand clearly that the invention can be implemented in a manner of software plus an essential general-purpose hardware platform. Based upon such understanding, the technical solutions of the invention or a part thereof contributing to the prior art can essentially be embodied in the form of a software product, which can be stored in a storage medium, e.g., an ROM/RAM, a magnetic disk, an optical disk, etc., and which includes several instructions to cause a computer device (which may be a personal computer, a server, a network device, etc.) to perform the methods according to the respective embodiments of the invention or some parts of the embodiments.

The invention can be described in a general context of computer executable instructions, e.g., a program module, for execution by a computer. Generally, the program module includes a routine, program, object, component, data structure, etc., which executes a specific task or embodies a specific abstract type of data. Alternatively, the invention can be implemented in a distributed computing environment in which a task is executed by a remote processing device connected over a communication network and in which the program module can be located in a local or remote computer storage medium including a storage device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for verifying a user, comprising:
receiving a service request associated with the user;
generating at a server a text-based first dynamic password upon receiving the service request;
including the first dynamic password and identification information associated with a user terminal associated with the user in an encapsulation;
converting the first dynamic password into sound information based at least in part on the encapsulation;
transmitting the sound information to the user terminal over a communication network based at least in part on the encapsulation;
receiving over the Internet a second dynamic password entered by the user based on the sound information, the second dynamic password being a text-based password;
comparing the first and second dynamic passwords for consistency; and
indicating that verification is successful in the event that the first and the second dynamic passwords are consistent, wherein the first and second dynamic passwords are consistent in the event the second dynamic password reflects the sound information associated with the first dynamic password, and indicating that the verification is unsuccessful in the event that the first and second dynamic passwords are inconsistent.

2. The method according to claim 1, wherein comparing the first and the second dynamic passwords for consistency includes determining whether their sound information matches.

3. The method according to claim 1, wherein the first and the second dynamic passwords are consistent but not identical.

4. The method according to claim 1, wherein the user terminal includes a telephone.

5. The method according to claim 1, wherein the first dynamic password is stored after it is generated.

6. The method according to claim 5, further comprising maintaining the first dynamic password.

7. The method according to claim 1, wherein the second dynamic password is received from a client device that is different from the user terminal.

8. A system for verifying a user, comprising:
one or more processors configured to:
receive a service request associated with the user;
generate at a server a text-based first dynamic password upon receiving the service request;
include the first dynamic password and identification information associated with a user terminal associated with the user in an encapsulation;
cause the first dynamic password to be converted into sound information based at least in part on the encapsulation;

transmit the sound information to the user terminal over a communication network based at least in part on the encapsulation;

receive over the Internet a second dynamic password entered by the user based on the sound information, the second dynamic password being a text-based password;

compare the first and second dynamic passwords for consistency; and indicate that verification is successful in the event that the first and the second dynamic passwords are consistent, wherein the first and second dynamic passwords are consistent in the event the second dynamic password reflects the sound information associated with the first dynamic password, and indicating that the verification is unsuccessful in the event that the first and second dynamic passwords are inconsistent; and one or more memories coupled to the one or more processors, configured to provide the one or more processors with instructions.

9. The system according to claim 8, wherein comparing the first and the second dynamic passwords includes comparing their sound information.

10. The system according to claim 8, wherein the first and the second dynamic passwords are consistent but not identical.

11. The system according to claim 8, wherein the user terminal includes a telephone.

12. The system according to claim 8, wherein the first dynamic password is stored after it is generated.

13. The system according to claim 12, wherein the one or more processors are further configured to maintain the first dynamic password.

14. A computer program product for verifying a user, the computer program product being embodied in a non-transitory computer readable storage medium and comprising computer instructions for:

receiving a service request associated with the user;

generating at a server a text-based first dynamic password upon receiving the service request;

including the first dynamic password and identification information associated with a user terminal associated with the user in an encapsulation;

converting the first dynamic password into sound information based at least in part on the encapsulation;

transmitting the sound information to the user terminal over a communication network based at least in part on the encapsulation;

receiving over the Internet a second dynamic password entered by the user based on the sound information, the second dynamic password being a text-based password;

comparing the first and second dynamic passwords for consistency; and indicating that verification is successful in the event that the first and the second dynamic passwords are consistent, wherein the first and second dynamic passwords are consistent in the event the second dynamic password reflects the sound information associated with the first dynamic password, and indicating that the verification is unsuccessful in the event that the first and second dynamic passwords are inconsistent.

15. The computer program product recited in claim 14, wherein comparing the first and the second dynamic passwords for consistency includes determining whether their sound information matches.

16. The computer program product recited in claim 14, wherein the first and the second dynamic passwords are consistent but not identical.

* * * * *